United States Patent [19]

Sasaki

[11] Patent Number: 5,014,152

[45] Date of Patent: May 7, 1991

[54] FLEXIBLE MAGNETIC DISC WITH A SPRING PLATE IN THE HUB

[75] Inventor: Kazuo Sasaki, Miyagi, Japan

[73] Assignee: Sony Corporation, Tokyo, Japan

[21] Appl. No.: 360,140

[22] Filed: May 31, 1989

[30] Foreign Application Priority Data

Jun. 14, 1988 [JP] Japan .............................. 63-786187[U]

[51] Int. Cl.$^5$ ...................... G11B 17/022; G11B 5/012
[52] U.S. Cl. ........................................ 360/135; 360/133
[58] Field of Search ................. 360/133, 135; 369/270, 369/271, 282

[56] References Cited

U.S. PATENT DOCUMENTS

| 1,915,348 | 6/1933 | Acheson | 369/282 |
| 4,545,047 | 10/1985 | Rickert | 369/270 |
| 4,630,156 | 12/1986 | Saito | 360/133 |
| 4,743,993 | 5/1988 | Ommori et al. | 360/133 |

FOREIGN PATENT DOCUMENTS 0114178  5/1987  Japan .................................... 360/135

Primary Examiner—David J. Severin
Attorney, Agent, or Firm—Alvin Sinderbrand; William S. Frommer

[57] ABSTRACT

In a flexible magnetic disc comprised of a circular flexible magnetic sheet, an elongated metal spring plate having a main portion and support portions at respective ends of the main portion, and a hub structure secured to the flexible magnetic sheet at the center thereof and having an opening extending axially therethrough; the hub structure has a pair of positioning surfaces at locations spaced apart from each other about a central axis of the opening, and a pair of seats for receiving the support portions of the elongated metal spring plate so as to mount the elongated metal spring plate on the hub structure with the main portion of the elongated metal spring plate positioned in opposing relationship to the pair of positioning surfaces, and a portion of the spring plate contiguous with, and extending along a lower edge of the main portion of the metal spring plate is bent away from the central axis of the opening.

4 Claims, 10 Drawing Sheets

FLEXIBLE MAGNETIC DISC WITH A SPRING PLATE IN THE HUB

BACKGROUND OF THE INVENTION

1. Field of the Invention

This invention relates generally to a novel flexible magnetic disc, and more particularly to a flexible magnetic disc of the type which has a hub structure for mounting the magnetic disc in position on a drive shaft of a magnetic disc drive unit.

2. Description of the Prior Art

Flexible magnetic discs such as floppy discs frequently have a hub structure including a center core secured to a central portion of a flexible magnetic sheet having a circular outer periphery. Such a floppy disc is rotatably carried by an outer rectangular case with the center core of the floppy disc exposed through the exterior of the case. When the floppy disc is to be used, the center core is mounted on a disc rotating shaft provided on a magnetic disc drive unit.

Various types of center cores are known in the prior art. One such center core for a 2-inch floppy disc has a pair of positioning surfaces on an inner periphery of an engaging hole formed at the center of the disc and includes a metal spring plate for resiliently pressing the positioning surfaces of the center core against a disc driving shaft of a magnetic disc drive unit. When the magnetic disc is to be mounted in position on the disc driving shaft, the shaft is inserted into the engaging hole of the magnetic disc whereupon the positioning surfaces of the center core of the magnetic disc and an inner face of the spring plate opposing the positioning surfaces contact an outer periphery of the disc driving shaft to resiliently align the middle of the center core with the axis of the disc driving shaft.

A flexible magnetic disc having a center core as described above is disclosed, for example, in U.S. Pat. No. 4,630,156 assigned to the assignee of the present application and is shown schematically in FIGS. 10 and 11 of the instant application.

Figure 10:
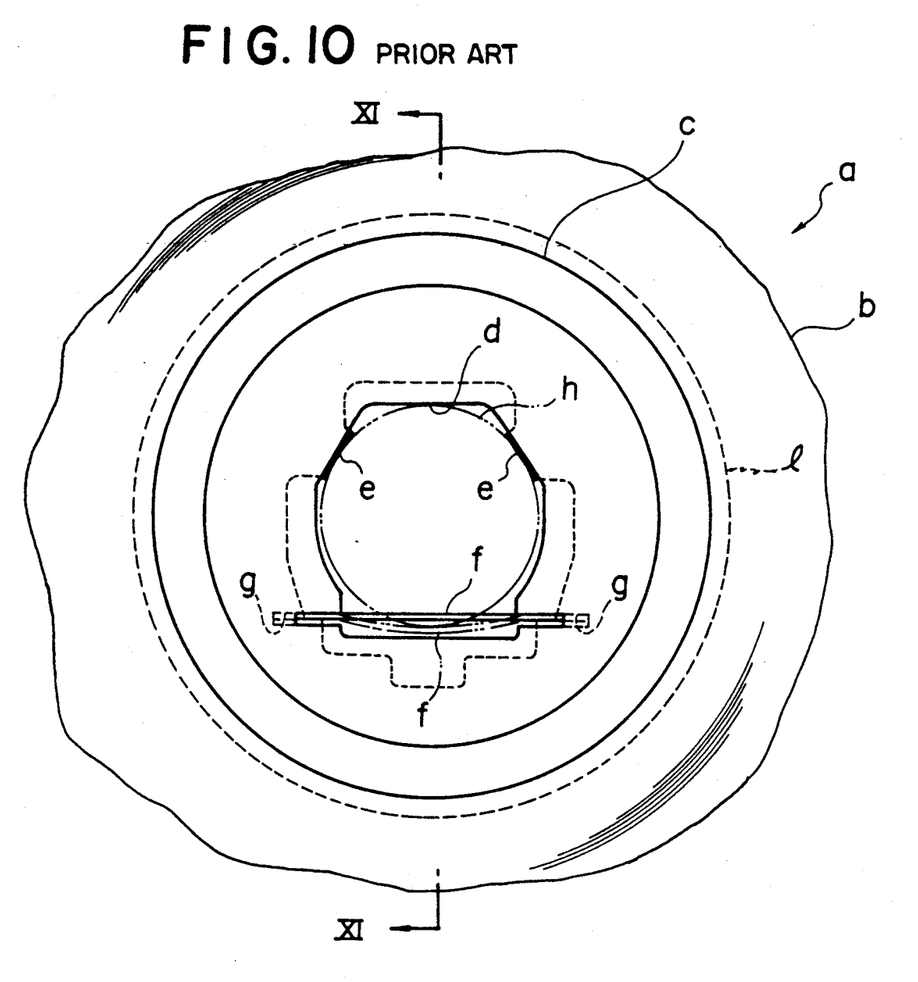
FIG. 10 is a partial plan view of a conventional flexible magnetic disc.
Figure 11:
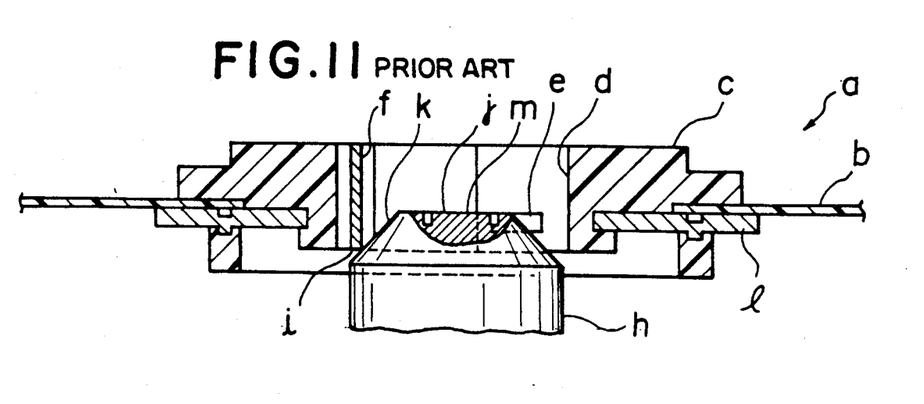
FIG. 11 is a sectional view taken along line XI—XI of FIG. 10.

Referring to FIGS. 10 and 11, a flexible magnetic disc (a) includes a flexible magnetic sheet (b) and a center core (c) secured to a central portion of the magnetic sheet (b). The center core (c) has an engaging hole (d) formed at a central portion thereof, the engaging hole (d) having a pair of positioning surfaces (e) formed on an inner periphery thereof. The positioning surfaces (e) lie on two equal sides of a substantially isosceles or equilateral triangle as seen in the plan view of FIG. 10, while a spring plate (f) is positioned along the remaining side of the triangle. The spring plate (f) is supported at the longitudinally opposing ends thereof in a pair of slits (g) formed in the inner peripheral portion of the engaging hole (d) of the center core (c) such that the spring plate (f) may be deformed laterally, that is, in a direction toward or away from the positioning surfaces (e).

The magnetic disc (a) is rotatably held in a cassette case (not shown), and when the cassette case is positioned in a cassette receiving section of a magnetic disc drive unit, a disc driving shaft (h) provided in the cassette receiving section is inserted into the engaging hole (d) of the center core (c) of the magnetic disc (a). In this instance, the positioning surfaces (e) of the center core (c) and a lower end face (i) of the spring plate (f) are contacted with and then slide downwardly along an inclined face (k) of a top portion (j) of a truncated conical surface of the disc driving shaft (h), and thereupon, the spring plate (f) is resiliently deformed away from the positioning surfaces (e) by the inclined face (k) of the disc driving shaft (h) to permit the magnetic disc (a) to be fitted in position onto the disc driving shaft (h). Meanwhile, the positioning surfaces (e) of the center core (c) are resiliently pressed against an outer periphery of the disc driving shaft (h) under the biasing force of the spring plate (f), thereby aligning the center of the magnetic disc (a) with the axis of the disc driving shaft (h). When the magnetic disc (a) is mounted in position on the disc driving shaft (h), the center core (c) thereof is attracted to a magnet (not shown) supported on a turntable (not shown) secured to the disc driving shaft (h) so that the magnetic disc is securely held in position on the turntable.

Such a conventional center core (c) has the drawback that the spring plate (f) may be caught by the top portion (j) of the disc driving shaft (h) and, thus, might not be loaded in the desired position. More specifically, when the disc driving shaft (h) is inserted into the engaging hole (d) of the center core (c), the lower end (i) of the spring plate (f) normally contacts the inclined face (k) of the top portion (j) of the disc driving shaft (h). However, in some cases the lower end (i) of the spring plate (f) first comes in contact with a top face (m) of the top portion (j) of the disc driving shaft (h) and then the center core (c) is displaced laterally in the cassette case after which the lower end (i) of the spring plate (f) contacts the inclined face (k) at the top portion (j) of the disc driving shaft (h). In the latter case, however, an edge of the lower end (i) of the spring plate (f) sometimes cuts into the inclined face (k) or the top face (m) of the disc driving shaft (h). This may prevent further downward movement of the center core (c). Consequently, the disc driving shaft (h) cannot then be inserted into the engaging hole (d) of the center core (c) of the magnetic disc (a).

Moreover, if the lower end (i) of the spring plate (f) cuts into the top portion (j) of the disc driving shaft (h), then the top portion (j) will be damaged. Consequently, even if the lower end (i) of the spring plate (f) is then released from the top portion (j) of the disc driving shaft (h) to permit positioning of the magnetic disc (a), when the same or another magnetic disc (a) is to be subsequently mounted onto the disc driving shaft (h), the probability is increased significantly that the spring plate (f) will be caught by the damaged portion of the disc driving shaft (h) and cannot then be loaded into position.

SUMMARY OF THE INVENTION

It is an object of the present invention to provide a flexible magnetic disc which assures smooth insertion of a disc driving shaft of a magnetic disc drive unit into an engaging hole of a center core thereof.

In accordance with the present invention, a flexible magnetic disc comprises flexible magnetic sheet having a circular outer periphery, an elongated metal spring plate having a main portion and support portions at respective ends of the main portion, and a hub structure secured to the flexible magnetic sheet at the center thereof and having an opening extending axially therethrough, the hub structure having a pair of positioning surfaces at locations spaced part from each other about a central axis of said opening, the hub structure including a pair of seating means for receiving the support portions of the elongated metal spring plate thereon to mount the elongated metal spring plate on the hub structure s that the main portion of the elongated metal spring plate is positioned in an opposing relationship with the pair of positioning surfaces, wherein a portion contiguous with a lower end of the main portion of the metal spring plate is bent away from the center axis of the opening.

In using the flexible magnetic disc according to the present invention, when a disc driving shaft of a flexible magnetic disc drive unit is inserted into the bore of the hub structure, the bent portion at the lower end of the spring plate is contacted with and resiliently deformed radially outwardly by a top face or an inclined face of a top portion of the disc driving shaft thereby to allow smooth insertion of the disc driving shaft into the opening of the hub structure. In this instance, as the portion contiguous to the lower end of the metal spring plate is bent away from the center axis of the opening, the metal spring plate does not have an edge which can cut into the top portion of the disc driving shaft.

Accordingly, when the magnetic disc is mounted onto a disc driving shaft, the spring plate thereof will not cut into an inclined face or top face of the disc driving shaft to prevent mounting of the magnetic disc. Consequently, mounting and centering of the magnetic disc can be achieved smoothly, and the top portion of the disc driving shaft will not be damaged by the spring plate of the magnetic disc.

The above and other objects, features and advantages of the present invention will become apparent from the following description and the appended claims, taken in conjunction with the accompanying drawings.

DETAILED DESCRIPTION OF THE PREFERRED EMBODIMENTS

Referring first to FIGS. 1(A) through 7, there is shown therein a flexible magnetic disc I according to one embodiment of the present invention. The flexible magnetic disc 1 includes a flexible magnetic sheet 2 and a center core 3 secured to a central portion of the magnetic sheet 2. The magnetic sheet 2 is made of a synthetic resin material and has a pair of layers of a magnetic substance formed on the opposite surfaces thereof. The magnetic sheet 2 has a circular outer periphery and, with particular reference to FIGS. 4 and 5, has a circular fitting hole 2a formed at a central portion thereof. The center core 3 includes a core base 4 made of a magnetic substance, a hub 13 and a spacer ring 27 secured to the core base 4 by outsert molding of a synthetic resin material, and a sheet securing cap 23 fitted on the hub 13.

Figure 5:
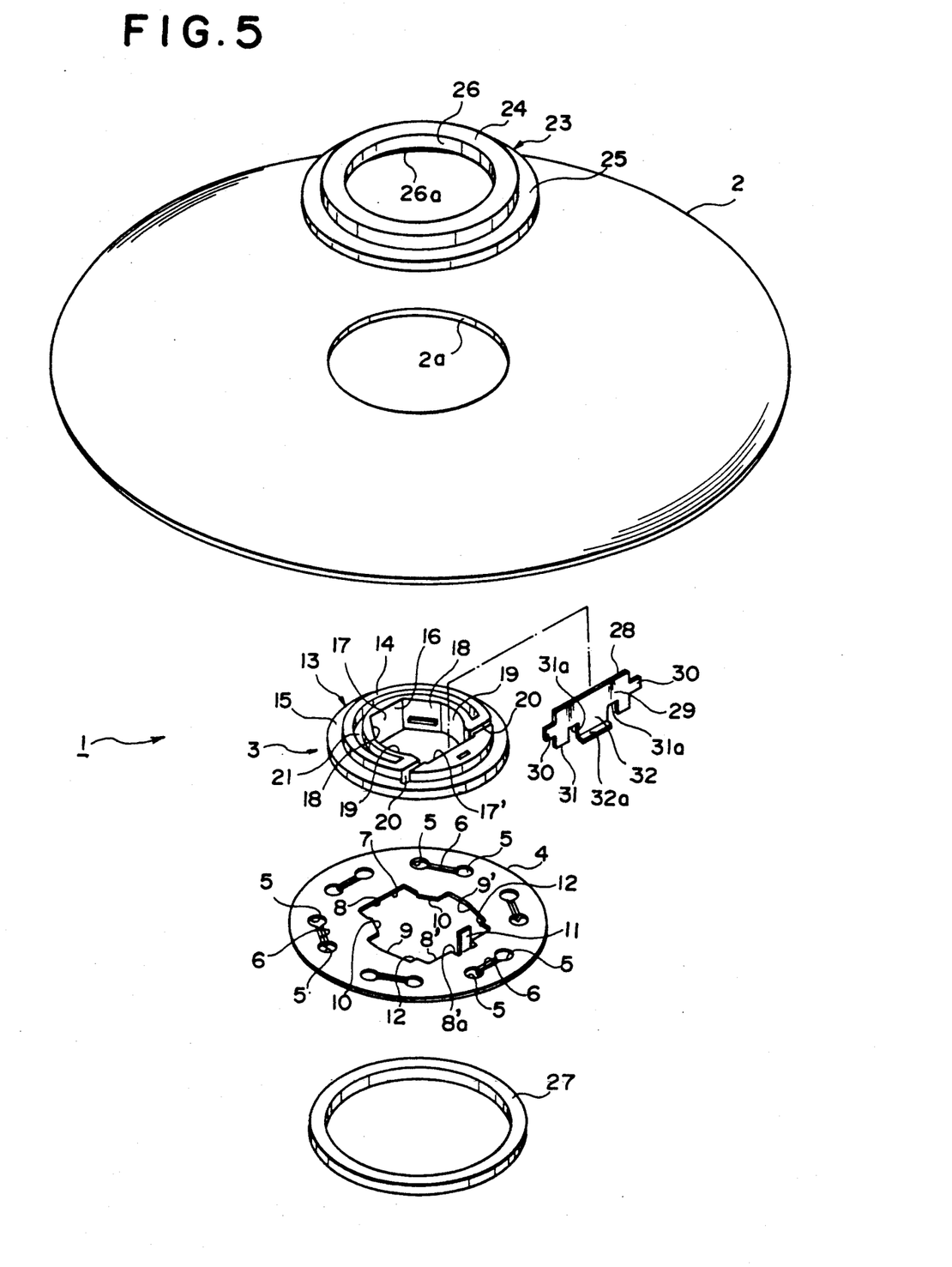
FIG. 5 is an exploded view of the magnetic disc of FIG. 1(A).

The core base 4 is in the form of a disc having an outer diameter slightly greater then the diameter of the fitting hold 2a of the magnetic sheet 2 and, with reference to FIG. 5, has a plurality of securing holes 5 formed in a spaced relationship by alternately greater and lesser distances in a generally circular array therein near an outer cirumferential edge thereof. Portions of the core base 4 between adjacent ones of the securing holes 5 spaced by the lesser distances are stamped to project downwardly from the plane of the core base 4 thereby to form grooves 6 in an upper wall of the core base 4, as seen particularly in FIGS. 4.

The core base 4 has a hole 7 formed in a central portion thereof. The hole 7 of the core base 4 has along an inner edge thereof a pair of edge portions 8 and 8' extending parallel to each other, a pair of non-parallel edge portions 9 and 9' extending in directions slightly oblique to a direction perpendicular to the parallel edge portions 8 and 8', and a pair of positioning edge portions or surfaces 10 located between the parallel edge portion 8 and adjacent ends of the non-parallel edge portions 9 and 9'. The positioning edge portions 10 extend along two equal sides of an equilateral or isosceles triangle the bisector of which extends through the center of the core base 4 of the magnetic disc 1 as seen particularly in FIG. 7. A recess 8'a is formed at a central portion of the parallel edge portion 8', and a bent lug 11 is formed at and extends upwardly from an edge of the recess 8'a. Further, the extremities of the nonparallel edge portions 9 and 9' adjacent the parallel edge portion 8' extend inwardly to form a pair of edge portions 12 opposing the parallel edge portion 8. The edge portions 12 serve to support thereon a spring plate 28 which is described hereinafter and are also referred to herein as "spring supporting edges".

The hub 13 center core 3 includes a main portion 14 in the form of a ring, and a flange portion 15 formed in an integral relationship with the main portion 14 from a synthetic resin material and extending radially outwardly substantially from an axially central portion of an outer periphery of the main portion 14. The flange portion 15 of the hub 13 has a circular outer periphery, and the outer diameter thereof is substantially equal to the inner diameter of the fitting hole 2a of the magnetic sheet 2.

The main portion 14 of the hub 13 has an engaging hole 16 formed therein such that a disc driving shaft 44, hereinafter described, may be removably fitted in the engaging hole 16 of the hub 13. The engaging hole 16 has a substantially hexagonal shape as viewed in the axial direction. In particular, an inner face of the engaging hole 16 of the hub 13 includes a pair of parallel face portions 17 and 17' extending parallel to each other with portion 17' being wider than portion 17, a pair of non-parallel opposing face portions 18 extending obliquely outwardly from opposite ends of the shorter parallel face portion 17 toward the longer parallel face portion 17', and a pair of further face portions 19 extending between the other extremities of the non-parallel face portions 18 and opposite ends of the longer parallel face portion 17'. The extremities of the further face portions 19 adjacent the longer parallel face portion 17' extend substantially in a direction perpendicular to the parallel face portions 17 and 17', and a pair of spring receiving slits 20 are formed in the hub 13 such that each of them extends to a substantially central portion of a respective extremity of the portions 19 and extends substantially in parallel to the parallel face portions 17 and 17'. The outer end of each of the spring receiving slits 20 extends to the flange portion 15.

The main portion 14 of the hub 13 has an arcuate groove 21 formed in an upper wall thereof extending radially outwardly of an edge of the engaging hole 16 with the exception of a portion thereof corresponding to the longer parallel face portion 17'.

Figure 1A:
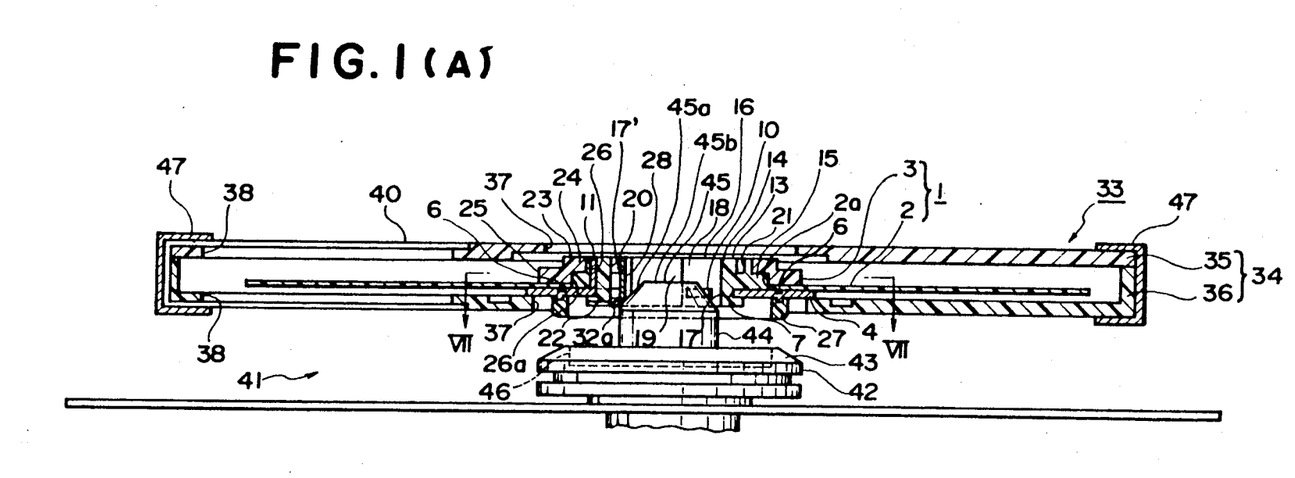
FIGS. 1(A) and 1(B) are sectional views through the axis of a magnetic disc in accordance with an embodiment of the present invention shown at different stages during mounting onto a spindle.
Figure 1B:
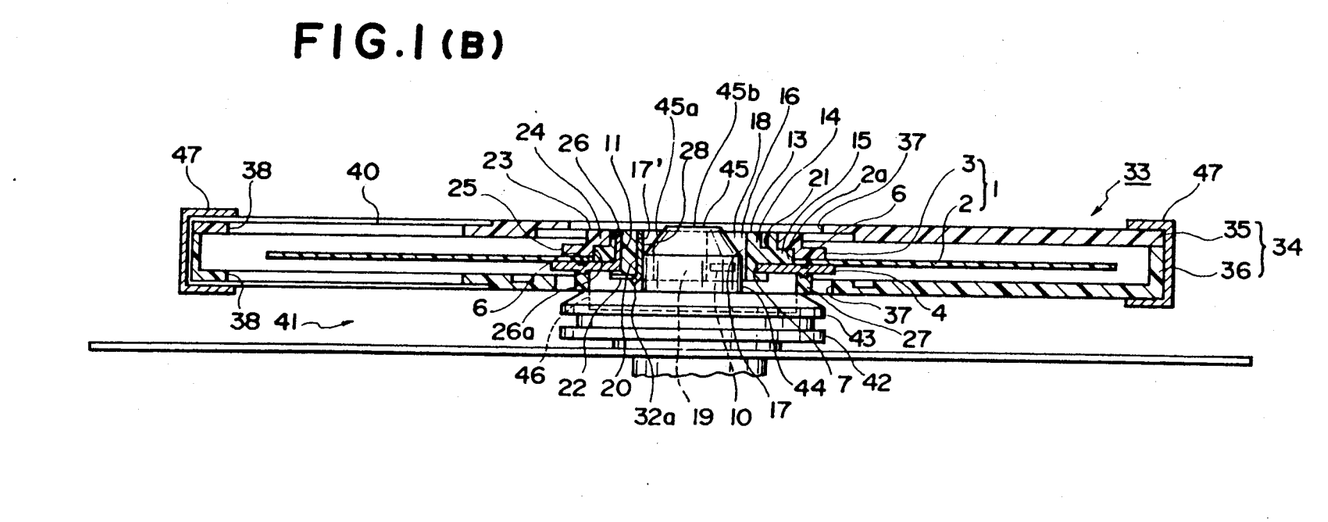
Figure 2:
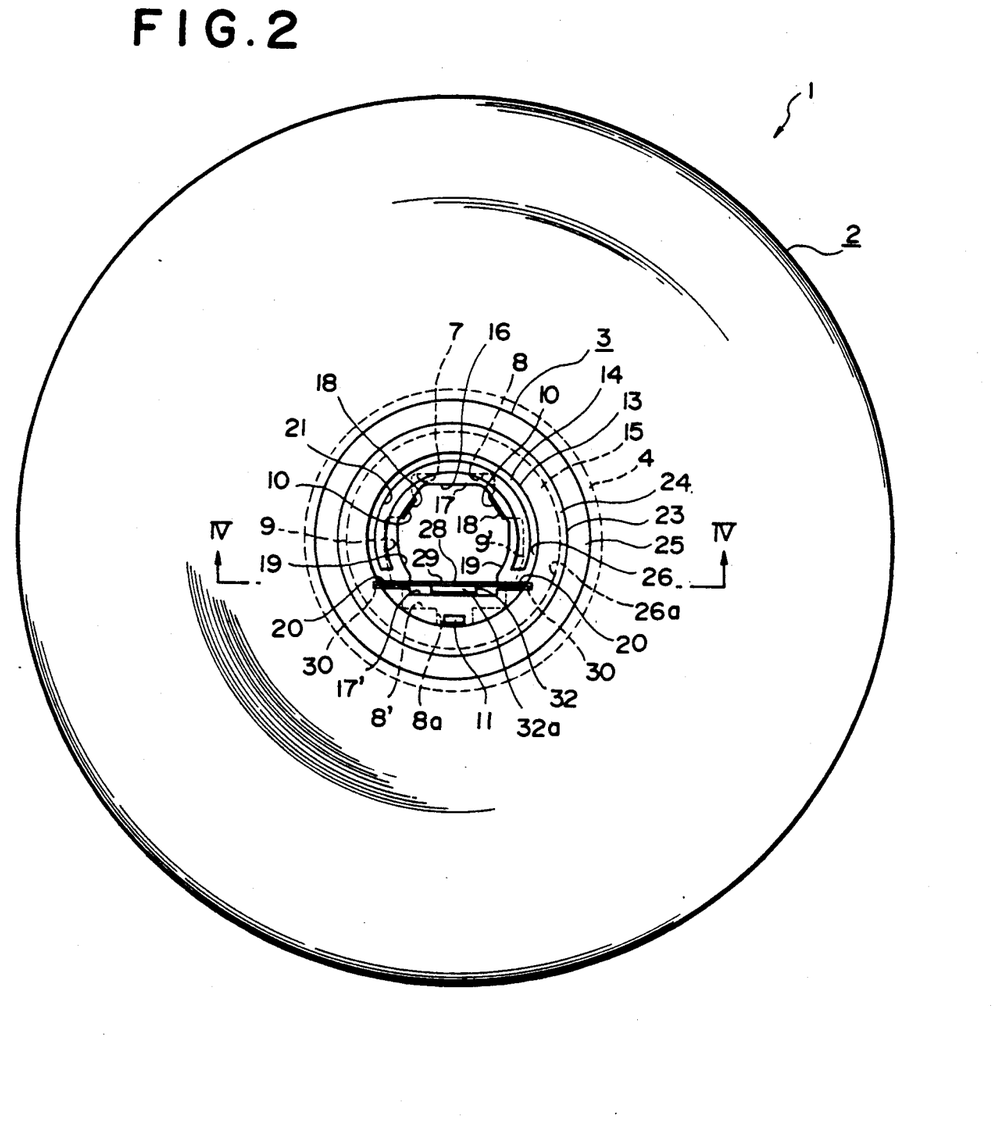
FIG. 2 is a plan view of the magnetic disc shown in FIG. 1(A)
Figure 3:
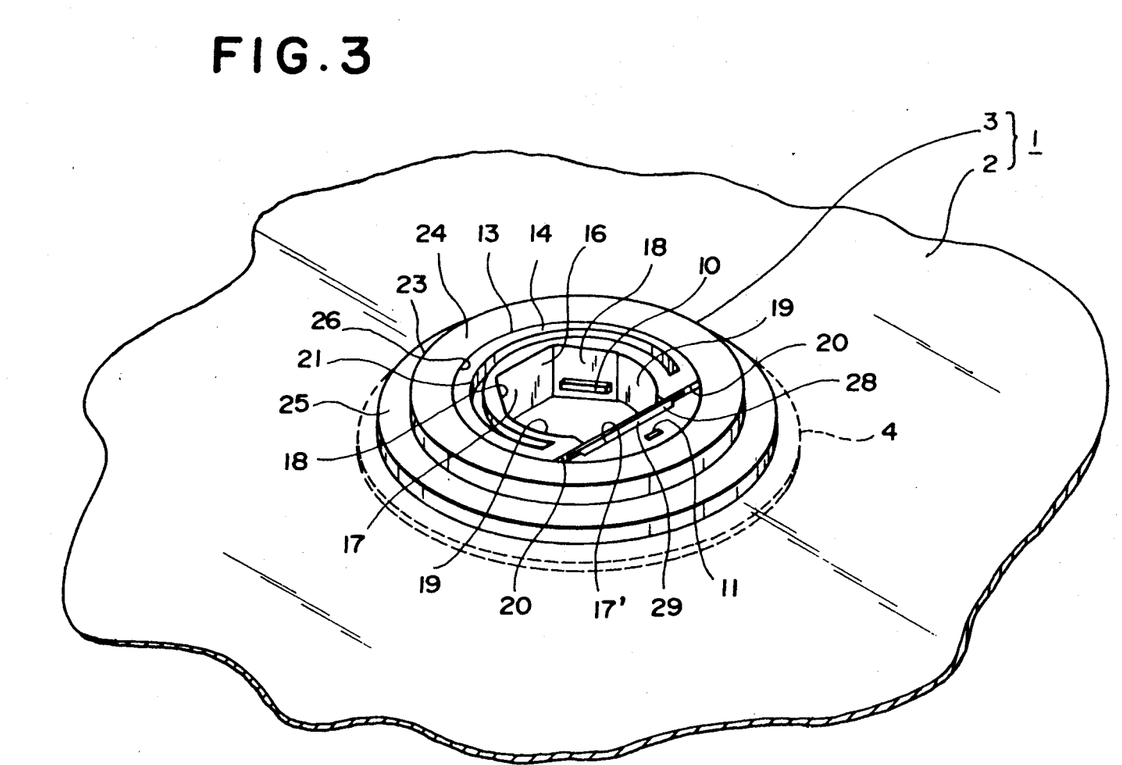
FIG. 3 is a perspective view of a portion of the magnetic disc shown in FIG. 1(A)
Figure 4:
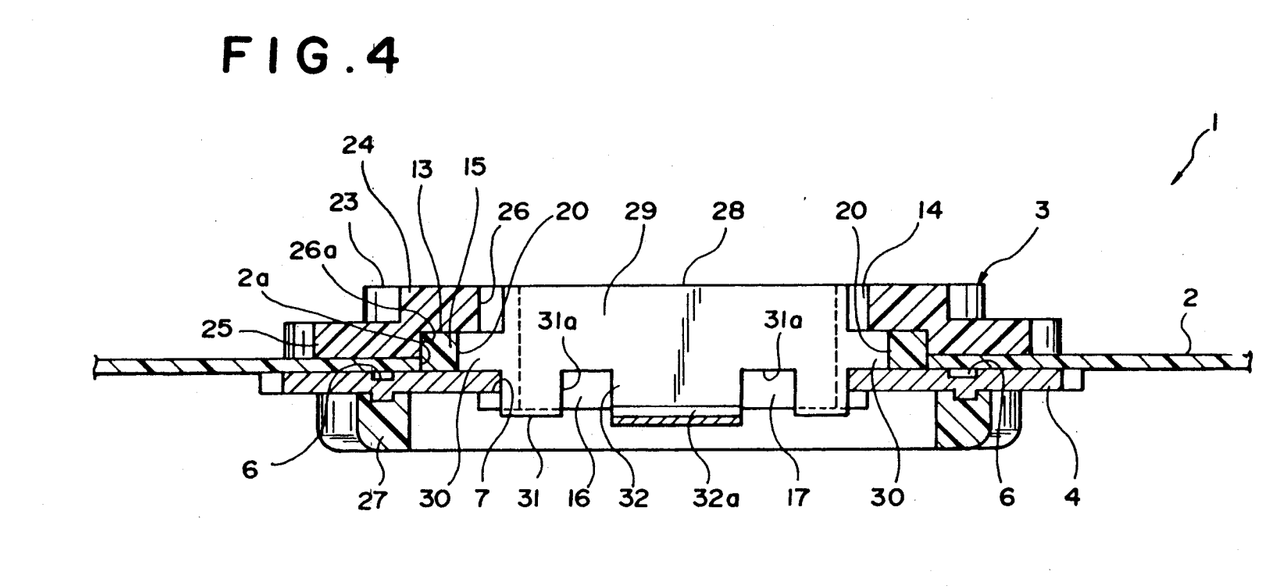
FIG. 4 is an enlarged sectional view taken along line IV—IV of FIG. 2.

The hub 13 is formed on and secured to the core base 4 by outsert molding such that a portion thereof above a lower face of the flange 15 projects upwardly from the core base 4 (while the hub 13 is shown separated from the core base 4 in FIG. 5 for illustrative purposes) and a portion of the core base 4 defining the central hole 7 is positioned in a buried manner at an outer peripheral wall near the lower extremity of the main portion 14 of the hub 13 as shown in FIGS. 1(A) and 1(B).

Figure 7:
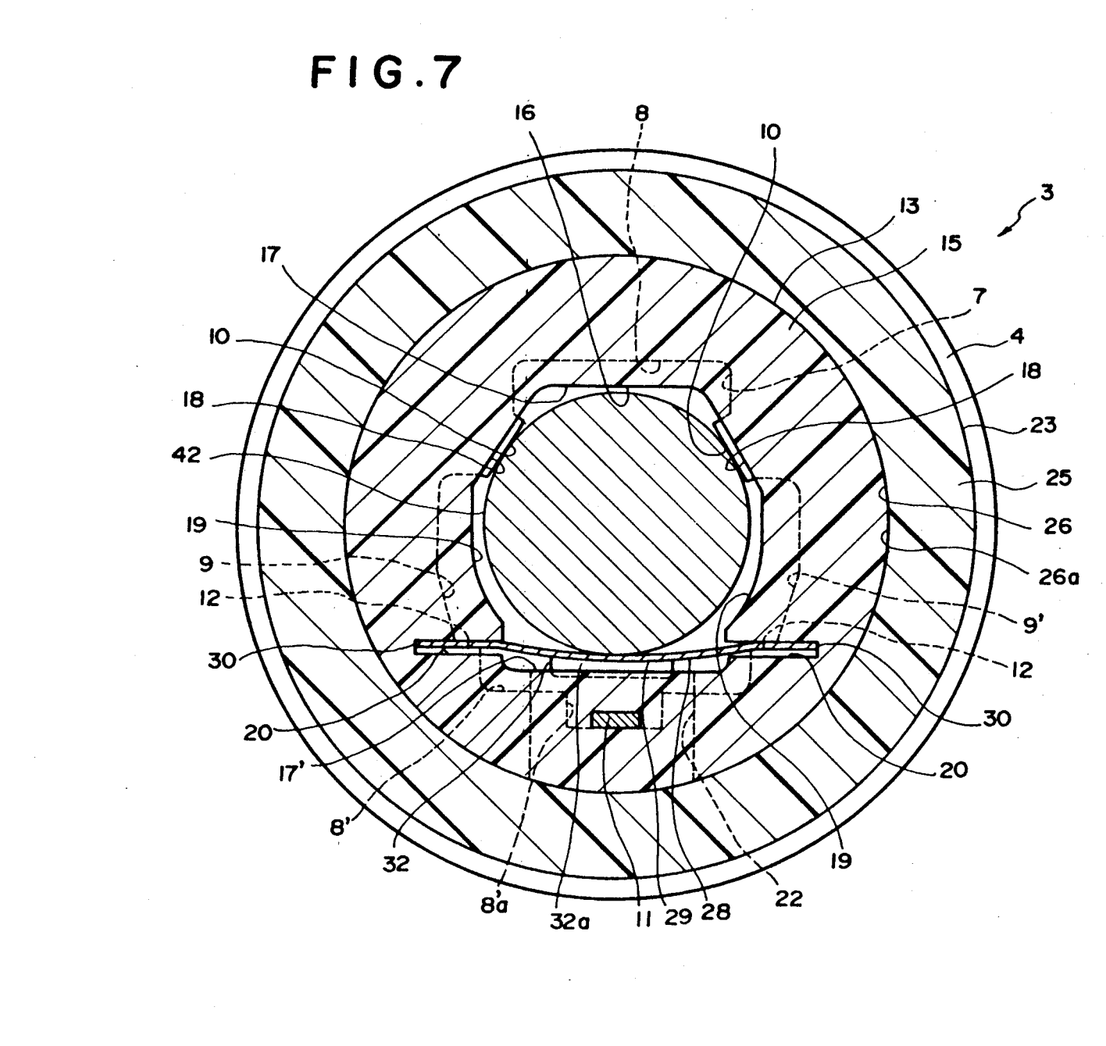
FIG. 7 is an enlarged sectional view taken along line VII—VII of FIG. 1(A)

While the inner edge of the central hole 7 of the core base 4 is, for the most-part, buried in the hub 13 as seen in FIG. 7, the positioning edge portions 10 are located such that they project inwardly from positions near the lower extremities of the face portions 18 and centered therein circumferentially. Meanwhile, the spring supporting edges 12 of the core base 4 extend to substantially central positions in the direction of the thickness of the spring receiving slits 20, and an upper end face of the projection 11 of the core base 4 is exposed in the upper face of the main portion 14 of the hub 13 between its outer periphery and the longer parallel face portion 17' of the main portion 14.

A shallow recess 22 is formed in a portion of a lower wall of the main portion 14 of the hub 13 contiguous with the longer parallel face portion 17'. Recess 22 extends from the parallel face portion 17' to the outer periphery of the main portion 14 as seen in FIGS. 1(A) and 1(B).

The sheet securing cap 23 for the center core 3 includes a fitting portion 24 in the form of a ring having an inner diameter substantially equal to the outer diameter of the main portion 14 of the hub 13, and a flange portion 25 having a circular outer periphery formed integrally with the fitting portion 24 from a synthetic resin material and extending laterally from a lower end portion of the fitting portion 24. The sheet securing cap 23 has a center bore 26 formed therein. The center bore 26 has a greater inner diameter at a lower portion 26a thereof than at its upper portion.

The sheet securing cap 23 is secured to the hub 13 by means of adhesion or ultrasonic welding such that the main portion 14 of the hub 13 is fitted in the center bore 26 of the sheet securing cap 23, while the fitting hole 2a of the magnetic sheet 2 is fitted around the flange portion 15 of the hub 13. It is to be noted that the flange portion 15 of the hub 13 is positioned in the greater diameter portion 26a of the center bore 26 of the sheet securing cap 23.

The sheet securing cap 23 and the assembly of the core base 4 and hub 13 are secured to each other with an inner peripheral portion of the magnetic sheet 2 surrounding the fitting hole 2a interposed therebetween.

The spacer ring 27 for the center core 3 has an outer diameter slightly smaller than the outer diameter of the core base 4 and is formed on the lower face of the core base 4 in a coaxial relationship therewith by outsert molding although it is shown separated from the core base 4 in FIG. 5 for purposes of illustration. The spacer ring 27 has a lower end face positioned below the lower face of the hub 13. It is to be noted that the spacer ring 27 is integrated with the core base 4 as it is partially received in the securing holes 5 and the grooves 6 formed in the core base 4.

The metal spring plate 28 of the center core 3 includes a main portion 29 having a substantially rectangular shape, and a pair of supporting portions 30 formed in an integral relationship at substantially central portions of the opposite longitudinal extremities of the main portion 29. The main portion 29 of the spring plate 28 has a pair of recesses or cutouts 31a formed at locations near the longitudinally opposing extremities of a lower edge 31 thereof and extending upwardly therefrom, and a lower central portion 32 between the cutouts 31a laterally bent at a lower end portion 32a thereof in an obliquely downward direction to form a bent portion 32a.

The metal spring plate 28 is supported by the hub 13, core base 4 and sheet securing cap 23 in the following manner. The supporting portions 30 of the spring plate 28 are placed against portions of the upper face of the core base 4 located laterally of the spring supporting edges 12 of the core base 4 and exposed in the spring receiving slits 20 of the hub 13, while the opposite end portions of the main portion 29 of the spring plate 28 are disposed between inner side faces of the spring receiving slits 20 closer to the non-parallel face portions 18 of the hub 13 and the spring supporting edges 12 of the core base 4. The bent portion 32a of the spring plate 28 is directed away from the non-parallel face portions 18 of the engaging hole 16 of the hub 13, and (with reference particularly to FIG. 4) the supporting portions 30 of the spring plate 28 oppose an upper face of the greater diameter portion 26a of the center bore 26 of the sheet securing cap 23. Consequently, the supporting portions 30 of the spring plate 28 are held vertically between the core base 4 and the sheet securing cap 23 to prevent vertical movement of the spring plate 28. Meanwhile, longitudinal movement of the spring plate 28 is restricted by outermost end faces of the spring receiving slits 20 of the hub 13, and bodily movement of the spring plate 28 in the direction of its thickness is prevented since the longitudinally opposing end portions of the main portion 29 of the spring plate 28 are held between the spring supporting edges 12 of the core base 4 and the inner side faces of the spring receiving slits 20.

The spring plate 28 is thus disposed in the engaging hole 16 of the hub 13 in an opposing relationship to the positioning edge portions 10 of the core base 4 from the inner side of spring plate 28, while the bent portion 32a at the lower end portion thereof is directed away from the positioning edge portions 10.

Figure 6:
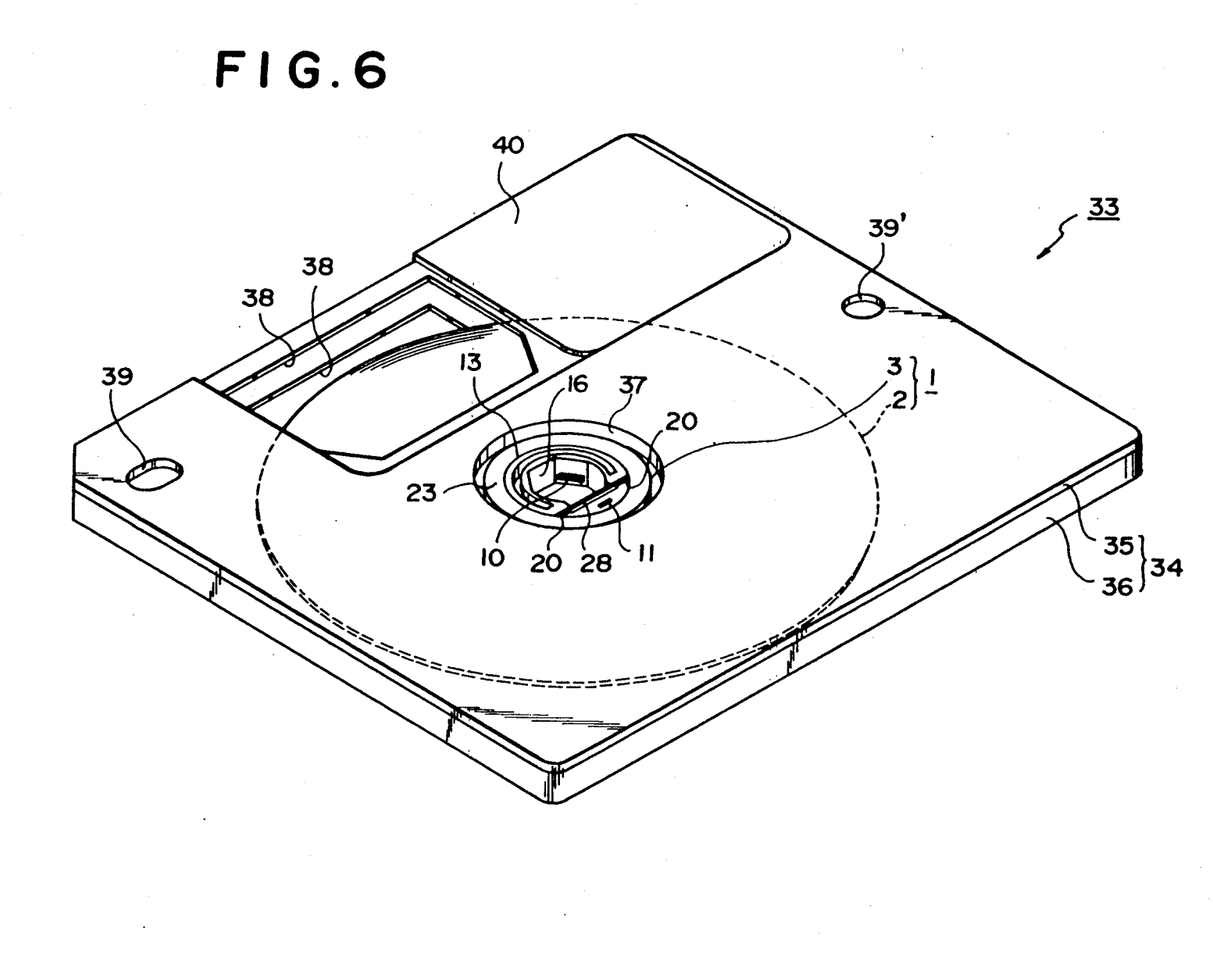
FIG. 6 is a perspective view of a cassette in which the magnetic disc of FIG. 2 is held.

With reference now to FIG. 6, the magnetic disc 1 constructed as described above is accommodated in a magnetic disc cassette 33.

The magnetic disc cassette 33 includes a cassette case 34 formed into a comparatively thin box from a pair of case halves 35 and 36 coupled in an integral relationship to each other. Opposing walls of the cassette case 34 have respective drive shaft holes 37 formed coaxially at substantially central locations thereof. A pair of head admitting windows 38 are formed in the opposing walls of the cassette case 34 near a first side edge thereof while pairs of positioning holes 39 and 39' are formed in each of the opposing walls of the cassette case near opposite side edges of the cassette case 34 extending from opposing ends of the first side edge. A shutter 40 for opening or closing the windows 38 of the cassette case 34 is supported for sliding movement along the first side edge of the cassette case 34.

The magnetic disc 1 is rotatably accommodated in the cassette case 34. The center core 3 of the magnetic disc 1 is exposed to the exterior of the cassette case 34 through the drive shaft holes 37.

It is to be noted that, when the magnetic disc cassette 33 is not in use, the shutter 40 is in its closed position in which it closes the windows 38 of the magnetic disc cassette 33, but when the magnetic disc cassette 33 is mounted in position on a magnetic disc drive unit (not shown), then it is moved by a suitable means (not shown) to an open position in which it opens the windows 38 of the magnetic disc cassette 33 as shown in FIG. 6.

Referring to FIGS. 1(A), 1(B) and 7, a recording/reproducing section of the magnetic disc drive unit is indicated at 41 and includes a spindle 42 connected to be rotated by a motor (not shown) and having a turntable 43 thereon, a disc driving shaft 44 extending upwardly from the center of the turntable 43 and having a top portion 45 of truncated conical configuration, a chucking magnet 46 secured to an upper face of the turntable 43, and a cassette carrier 47 for removably carrying a magnetic disc cassette 33 therein.

It is to be noted that the portion of the disc driving shaft 44 other than the top portion 45 has a diameter a little greater than the diameter of a circle inscribed by the spring plate 28 and the two positioning edge portions 10 provided in the engaging hole 16 of the center core 3.

Thus, when the cassette carrier 47 in which a magnetic disc cassette 33 is carried is moved to a cassette mounting position of the recording/reproducing section 41, the cassette case 34 of the magnetic disc cassette 33 is positioned by means (not shown), and then the disc driving shaft 44 is inserted into the engaging hole 16 of the center core 3 of the magnetic disc 1. In particular, the magnetic disc cassette 33 is moved toward the spindle 42 to position the engaging hole 16 coaxially with the disc driving shaft 44, and when the magnetic disc cassette 33 arrives at a position slightly forward of the cassette mounting position, the top portion 45 of the disc driving shaft 44 is inserted into the engaging hole 16 and part of the edge on the lower side of the engaging hole 16 and the bent portion 32a of the lower central portion 32 of the spring plate 28 come in contact with the inclined face 45a of the top portion 45 as seen in FIG. 1(A). Consequently, the top portion 45 of the disc driving shaft 44 presses against the main portion 29 of the spring plate 28 which is thus deformed away from the positioning edge portions 10 of the engaging hole 16. Thereupon, the center core 3 is urged in the direction that the spring plate 28 is deformed so that the positioning edge portions 10 are pressed against the outer periphery of the disc driving shaft 44. It is to be noted that the bent portion 32a of the lower central portion 32 of the spring plate 28 is thereupon advanced into the recess 22 formed in the lower wall of the hub 13 as seen in FIG. 1(B).

Then, just before the magnetic disc cassette 33 reaches the cassette mounting position, the center core 3 is placed onto the turntable 43 so that the spacer ring 27 of the center core 3 contacts the upper face of the turntable 43, and accordingly, the core base 4 which is made of a magnetic substance is attracted to the magnet 46 so that the center core 3 is fixedly mounted on the turntable 43, as seen in FIG. 1(B). Consequently, the magnetic disc 1 is securely mounted on the spindle 42, thereby completing the insertion of the disc driving shaft 44 into the engaging hole 16. With the magnetic disc 1 in this position, the two positioning edge portions 10 are biased with sufficient force against the outer periphery of the disc driving shaft 44 to center the magnetic disc 1 with respect to the spindle 42.

When the magnetic disc 1 is securely mounted onto the spindle 42 in this manner, the lower end portion of the spring plate 28 initially comes in contact with the top portion 45 of the disc driving shaft 44. However, since the central portion 32a at the lower end portion of the spring plate 28 is bent away from the positioning edge portions 10 the edges of the spring plate 28 do not abut the top portion 45 of the disc driving shaft 44. Accordingly, when the lower end portion of the spring plate 28 contacts the top portion 45, it will not cut into its outer face, so that it slides smoothly on the inclined face 45a of the top portion 45.

Figure 8:
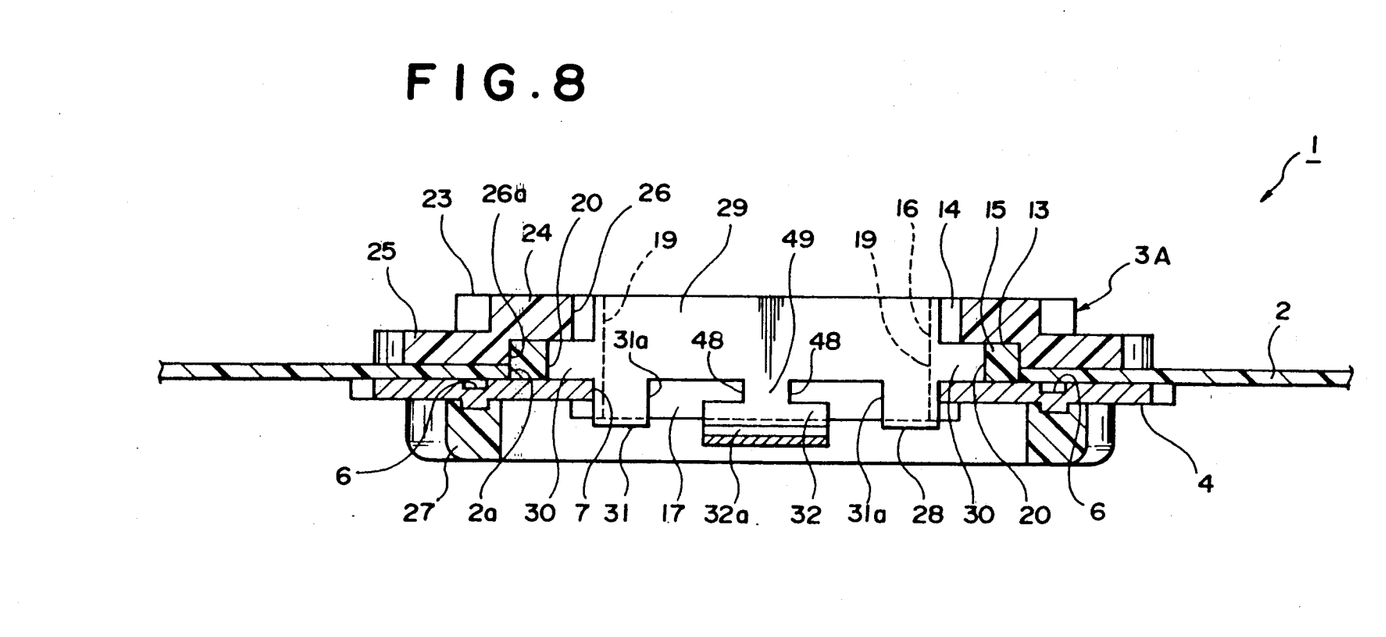
FIG. 8 is a partial sectional view of a magnetic disc in accordance with a second embodiment of the present invention.

Referring now to FIG. 8, a flexible magnetic disc according to a second embodiment of the present invention is illustrated therein. The magnetic disc of the FIG. 8 embodiment is generally similar to the magnetic disc of the first embodiment described above and differs from the latter only in the configuration of a lower end portion of a spring plate of a center core thereof. Accordingly, like parts or elements of the FIG. 8 embodiment are indicated by the same reference characters as those of the preceding embodiment shown in FIGS. 1(A) to 7, and a description thereof is omitted herein for simplicity and clarity.

A metal spring plate 28 in the magnetic disc as shown in FIG. 8 has a pair of cutouts 48 formed in a lower central portion 32 thereof with a neck-like connecting portion 49 defined therebetween such that the lower central portion 32 and the connecting portion 49 have a substantially inverted T-shaped configuration as viewed in front elevation in FIG. 8. The lower central portion 32 is thus connected to the remainder of a main portion 29 of the spring plate 28 by way of the connecting portion 49 of reduced width. Accordingly, the spring constant of the spring plate 28 can be selected as a suitable value by means of the connecting portion 49 despite the presence of a bent portion 32a on the lower central portion 32. More specifically, since the bent portion 32a is bent in the direction of the thickness of spring plate 28, the rigidity of the spring plate 28 in the direction of its thickness is increased significantly thereby so that the spring constant of the spring plate 28 is consequently increased. As a result, the resistance to insertion of the disc driving shaft 44 into the engaging hole 16 of the center core 3 is increased, so that the magnetic disc 1 may not be fully mounted or else may not be accurately centered. This problem may be addressed by using a thinner metal spring plate to 10 construct the spring plate 28 of the first embodiment described in connection with FIGS. 1A through 7 than that used for the conventional spring plate (f) described hereinabove. This, however, increases the deformability of the material itself, and consequently, it is possible that a fold may be produced between the extremities of main portion 29 where it is supported on hub 13 or core base 4 and a portion thereof intermediate said extremities. In the magnetic disc of the second embodiment, however, since the cutouts 48 are provided for the lower central portion 32 of the main portion 29, the rigidity of any portion of the spring plate 28 other than the lower central portion 32 will be increased only slightly. Accordingly, a material having a thickness similar to that of the conventional spring plate (f) of FIGS. 10 and 11 can be used for the spring plate 28.

Figure 9:
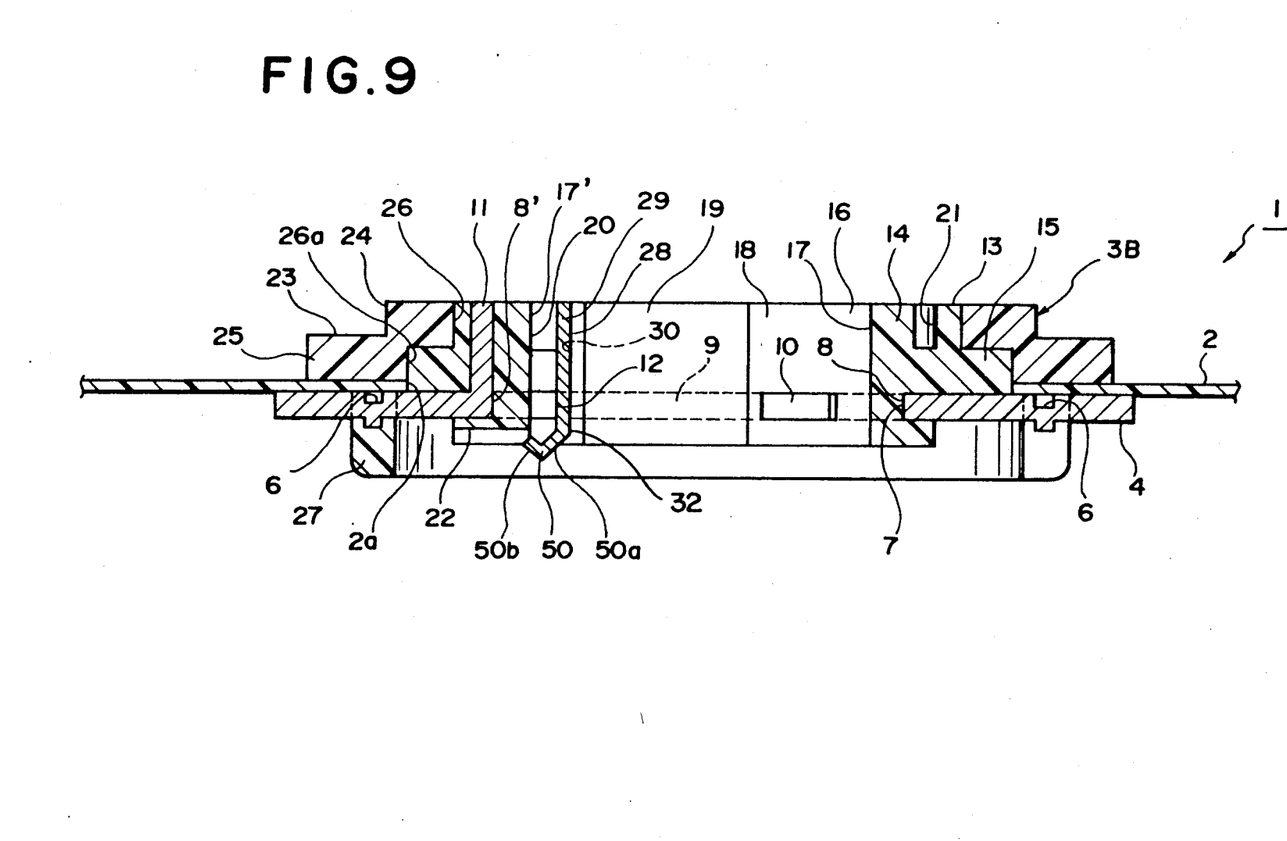
FIG. 9 is a partial sectional view of a magnetic disc in accordance with a third embodiment of the invention.

Referring now to FIG. 9, there is shown a modification of the magnetic disc of the first embodiment of the present invention described hereinabove. The modified magnetic disc of FIG. 9 differs from the magnetic disc of the first embodiment only in the profile of a bent portion provided in a central piece at a lower end portion of a spring plate of a center core. Accordingly, like parts or elements of the FIG. 9 embodiment are indicated by the same reference characters as those of the first embodiment shown in FIGS. 1(A) to 7, and description thereof is omitted herein for simplicity and clarity.

More specifically, a bent portion 50 of a lower central portion 32 in a metal spring plate 28 includes a portion 50a extending obliquely laterally and downwardly from the lower end of the lower central portion 32 and corresponding to the bent portion 32a of the spring plate 28 in the first embodiment described hereinabove. Spring plate 28 also includes a further portion 50b extending obliquely laterally and upwardly from the lower end of the portion 50a. The bent portion 50 is thus substantially V-shaped as seen in side elevation in FIG. 9. Accordingly, the bent portion 50 of the spring plate 28 presents no edge at the lower end thereof. Consequently, the possibility that the lower end of the spring plate 28 will cut into the inclined face 45a or top face 45b of the disc driving shaft 44 as shown in FIGS. 1A and 1B when the spring plate 28 contacts the top portion 45 of the disc driving shaft 44 can be prevented with greater certainty.

It is to be noted that, while in the embodiments described hereinabove the center core includes a core base made of a magnetic substance having pressing surfaces which extend inwardly from an inner periphery of the engaging hole of the hub, the pressing surfaces may instead be formed integrally with the hub on said inner periphery.

Having now fully described the invention, it will be apparent to one of ordinary skill in the art that many changes and modifications can be made thereto without departing from the spirit and scope of the invention as defined in the appended claims.

What is claimed is:

1. A flexible magnetic disc, comprising:
a flexible magnetic sheet having a circular outer periphery;
an elongated metal spring plate having a main portion and support portions at opposed ends of said main portion;
a hub structure secured to said flexible magnetic sheet at the center and having an opening extending axially therethrough, said hub structure having a pair of positioning surfaces at locations spaced apart from each other about a central axis of said opening, said hub structure including a pair of seating means for receiving said support portions of said elongated metal spring plate thereon to mount said elongated metal spring plate on said hub structure so that said main portion of said elongated metal spring plate is positioned in an opposing relationship with said pair of positioning surfaces;
said metal spring plate including a portion contiguous with, and extending along a lower edge of said main portion and which is bent away from said central axis of said opening.

2. A flexible magnetic disc, comprising:
a flexible magnetic sheet having a circular outer periphery;
an elongated metal spring plate having a main portion and support portions at opposed ends of said main portion;
a hub structure secured to said flexible magnetic sheet at the center and having an opening extending axially therethrough, said hub structure having a pair of positioning surfaces at locations spaced apart from each other about a central axis of said opening, said hub structure including a pair of seating means for receiving said support portions of said elongated metal spring plate thereon to mount said elongated metal spring plate on said hub structure so that said main portion of said elongated metal spring plate is positioned in an opposing relationship with said pair of positioning surfaces;
said metal spring plate including a portion contiguous with a lower edge of said main portion and which is bent away from said central axis of said opening, and said main portion of said metal spring plate having a pair of cutouts at opposite sides of said bent portion, each of said cutouts extending upwardly from the lower edge of said main portion.

3. A flexible magnetic disc, comprising:
a flexible magnetic sheet having a circular outer periphery;
an elongated metal spring plate having a main portion and support portions at opposed ends of said main portion;
a hub structure secured to said flexible magnetic sheet at the center and having an opening extending axially therethrough, said hub structure having a pair of positioning surfaces at locations spaced apart from each other about a central axis of said opening, said hub structure including a pair of seating means for receiving said support portions of said elongated metal spring plate thereon to mount said elongated metal spring plate on said hub structure so that said main portion of said elongated metal spring plate is positioned in an opposing relationship with said pair of positioning surfaces;
said metal spring plate including a portion contiguous with a lower edge of said main portion and which is bent away from said central axis of said opening said bent portion of said metal spring plate being connected to said main portion by way of a neck portion which is narrower than said bent portion and which is defined between cutouts formed in both sides of said bent portion of said metal spring plate.

4. A flexible magnetic disc, comprising:
a flexible magnetic sheet having a circular outer periphery;
an elongated metal spring plate having a main portion and support portions at opposed ends of said main portion;

a hub structure secured to said flexible magnetic sheet at the center and having an opening extending axially therethrough, said hub structure having a pair of positioning surfaces at locations spaced apart from each other about a central axis of said opening, said hub structure including a pair of seating means for receiving said support portions of said elongated metal spring plate thereon to mount said elongated metal spring plate on said hub structure so that said main portion of said elongated metal spring plate is positioned in an opposing relationship with said pair of positioning surfaces;

said metal spring plate including a portion contiguous with a lower edge of said main portion and which is bent away from said central axis of said opening, said bent portion of said metal spring plate including a first portion extending away from the axis of said opening in a first axial direction and a reverted edge portion extending from said first portion and in a second axial direction.

* * * * *